United States Patent

Burns

[11] 4,111,106
[45] Sep. 5, 1978

[54] AUTOMOBILE VENTILATION SYSTEM

[76] Inventor: William M. Burns, 10306A Malcolm Cir., Cockeysville, Md. 21030

[21] Appl. No.: 788,354

[22] Filed: Apr. 18, 1977

[51] Int. Cl.² .............................................. B60J 1/20
[52] U.S. Cl. ........................................ 98/2.13; 98/37; 98/40 A; D12/181
[58] Field of Search ............... 98/2, 2.12, 2.13, 2.14, 98/2.15, 2.17, 2.19, 40 A, 40 C, 40 N, 44, 26, 27, 93, 37, 2.02; D12/181, 183

[56] References Cited
U.S. PATENT DOCUMENTS

| D. 169,469 | 5/1953 | Anderson | D12/181 |
|---|---|---|---|
| 953,350 | 3/1910 | Schrader | 98/27 |
| 1,083,536 | 1/1914 | Hammond | 98/27 |
| 1,539,534 | 5/1925 | Ansell | 98/2.14 |
| 2,056,757 | 10/1936 | Adameikas | 98/40 A |
| 2,223,709 | 12/1940 | Wickstrom et al. | 98/93 |
| 2,612,830 | 10/1952 | Kendrick | 98/2.02 |
| 2,680,646 | 6/1954 | Bush | 98/2.13 |
| 2,715,866 | 8/1955 | Monsel | 98/2.13 |
| 3,434,408 | 3/1969 | Rivers et al. | 98/2.13 |
| 4,050,363 | 9/1977 | Fuerest | 98/37 |

Primary Examiner—Henry C. Yuen
Attorney, Agent, or Firm—John F. McClellan, Sr.

[57] ABSTRACT

An improved ventilation system for automobiles and the like which have windows which can be rolled down or similarly adjusted, comprising an energy saving insert assembly for capture between a rolled down window and the window frame above it; the insert assembly including an external scoop for forcing air into the automobile and an internal orientable nozzle for adjustably directing the forced air; special configuration adjusts the system to compensate for speed of the automobile, and makes one design fit either side of the automobile.

7 Claims, 4 Drawing Figures

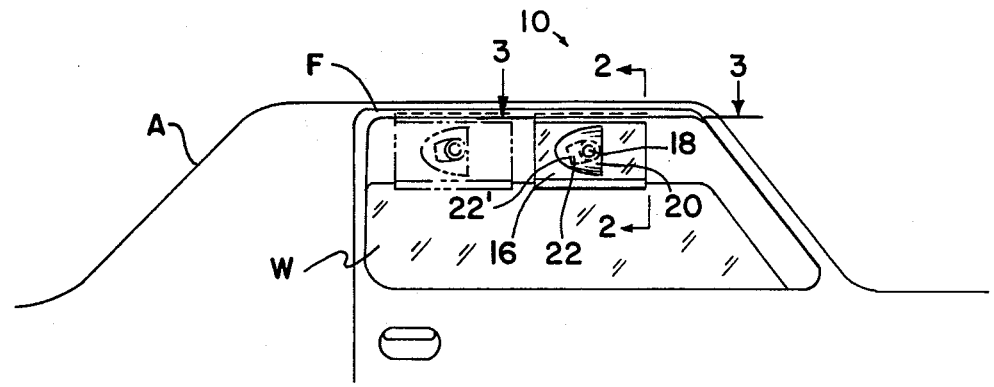
FIG.1
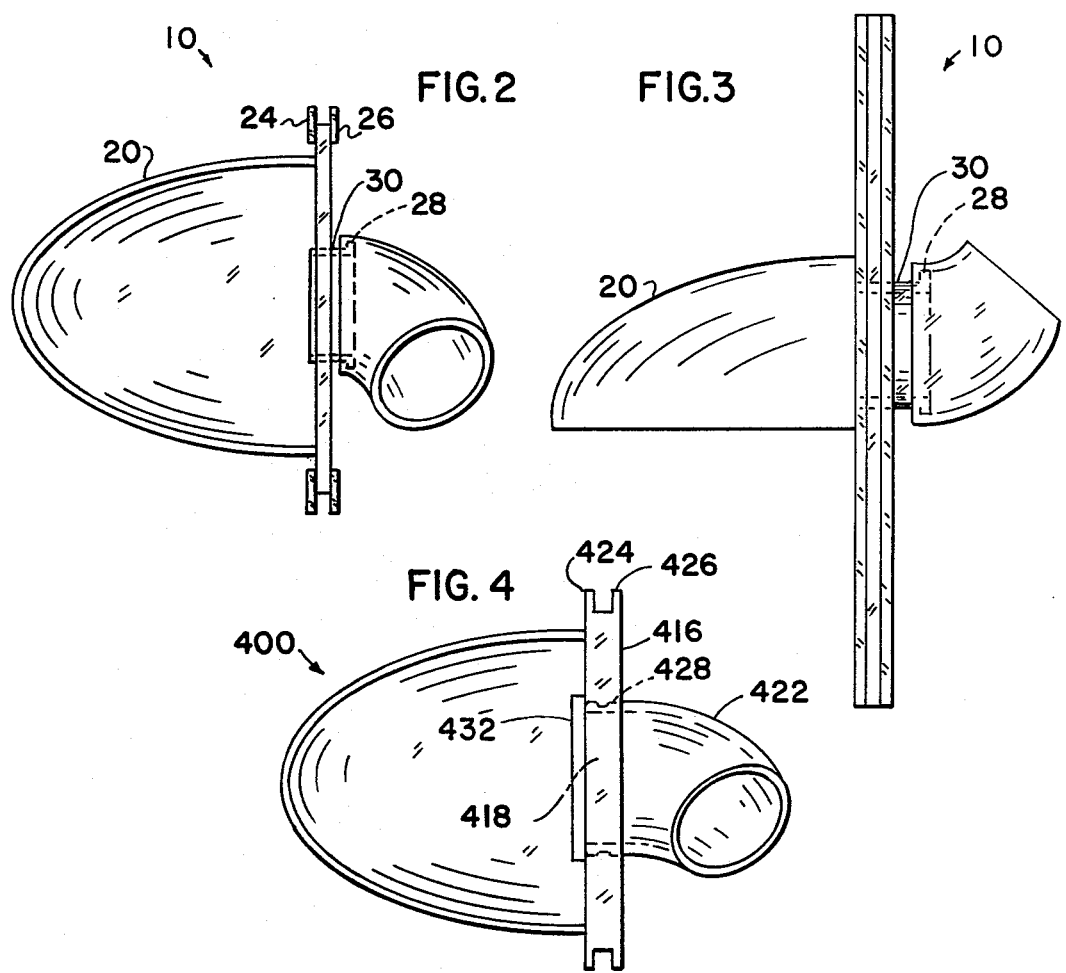

AUTOMOBILE VENTILATION SYSTEM

This invention relates generally to ventilation systems and specifically to ventilation systems for automobiles and the like.

Although automobiles as we know them have been in use for more than 80 years, ventilation remains a problem, particularly with vehicles lacking the side vent structure which was for nearly 40 years almost a standard provision. Several million automobiles on the roads lack these vents and there is little indication that they will again be provided.

Even the best of the side vents according to the usual installation failed to direct the air exactly where it was wanted, there being no provision for fore-and-aft adjustment and up and down adjustment, and energy saving features as compared with air conditioning otherwise falling short of the present invention.

Efforts have been made in the prior art to provide varius appliances which can relieve deficiencies in automotive ventilation, as exemplified by the following U.S. Pat. disclosures:

No. 3,434,408 to J. F. Rivers et al., 3-25-69;
No. 3,279,349 to M. Landau, 10-18-66;
2,749,830 to L. C. George, 6-12-56;
2,715,866 to C. K. Mousel, 8-23-55;
2,680,646 to E. W. Bush, 6-8-54;
1,457,969 to W. B. Brauscher, 6-5-23.

Rivers et al. disclose air vents with scoops installed above a vehicle window and having air vents and baffles for control and shut-off.

Landau discloses a scoop type air vent for building walls.

George discloses a plastic type louvered air vent for installation over automobile windows.

Mousel discloses an orientable disc ventilator in a panel carried over an automobile window.

Bush discloses an over-the-window strip for automobiles, with an exterior scoop and an interior tubular member for directing the air in a particular direction (to a live bait tank is shown).

Brauscher discloses a dual, back to back scoop with shut-off plates for mounting over a vehicle window for ventilation.

However, regardless of any similarity in window holding or installation or of function or otherwise, none of the devices disclosed in these patents nor any other known to be in the prior art provides the combined advantages which are the objects of the present invention to provide, or the venting structure including the relative length and nozzle and scoop arrangements.

A principal object of the present invention is to provide an easily installed and convenient system for automobiles and the like with roll-down windows which ventilates in directions desired in the interior of the automobile and to the degree wanted, regardless of other provisions for ventilation, therefore largely conserving energy otherwise wasted in air conditioning.

A further object is to provide a ventilating system as described which fits all automobiles of the type described and which functions on either or both sides equally well and without need for adapters.

Further objects are to provide a ventilating system which is simple to use and reliable in operation, which requires a minimum of materials, which is substantial, durable and trouble free, which is economical to manufacture and to purchase, and which is attractive in appearance.

In brief summary given for cursive description only and not as limitation, the invention includes a generally rectangular plate with an air scoop on one side in communication with a position-adjustable nozzle on the other side, the plate preferably having similar attachment means at the top and bottom and preferably being short relative to the space available for installation, providing for fore-and-aft positional adjustment.

The above and other objects and advantages of this invention will become more readily apparent on examination of the following description, including the drawings in which like reference numerals refer to like parts.

FIG. 1 is a side elevational view showing the invention installed in an automobile;

FIG. 2 is a view adapted from 2—2, FIG. 1;

FIG. 3 is a view adapted from 3—3, FIG. 1; and

FIG. 4 is a side elevational view of a second embodiment.

FIG. 1 shows the invention 10 installed in an automobile A, the window W of which is first rolled down to permit insertion of the invention and is then rolled part way up to clamp the invention in place between the window and the upper frame F of the window.

The invention has a generally rectangular plate 16 having a central circular aperture or hole 18.

On the outer face an air scoop 20 covers the hole and on the inner face a duct 22 with at least a preferably necked-down nozzle portion 22' orientable for expelling air in a selected direction, coaxially communicates with the hole to receive air flow from the scoop. The neckeddown portion increases the velocity of air passed therethrough.

Advantageously, the ends of the plate are upright, the upper and lower edges of the plate are parallel and the length is proportionally short relative to the window opening; it may extend one-half the length of the opening above the window, so that a space is left in front of the plate and behind the plate. About 9 inches has been found to be a good length for the plate and about 5 inches a good height.

In operation, forward motion of the automobile causes the air scoop to force air through the hole and out the rotatable duct. To adjust the direction of the output the rotatable duct is oriented in the desired direction, and to adjust the volume of air the plate is slid forward to increase air flow through the duct, and (phantom lines) rearward to decrease it. It has been found that the openings ahead of and behind the plate have surprisingly little effect regardless of the sliding adjustment positon of the plate, although for a given speed the extreme forward position is quieter. Air forced in by invention can conveniently exhaust past the ends.

FIG. 2 and FIG. 3 show respectively the front elevation and the top plan view of the invention, including the relation of the scoop 20, which may advantageously be, for efficiency, of quarter-ellipsoidal shape with the front open and the minor diameter free edges cemented to the plate. The projection from the plate is preferably about 4 inches. For tongue-and-groove engagement with the window edge, both the upper and lower edges of the plate have a generally bifurcate or protrusive double-flange attachement shape in cross-section; the paired flanges may be formed by strips 24, 26 cemented in place on the outer face and the inner face respectively. This structure adapts the invention of use on either the left or the right side of an automobile, simply by inverting the invention to change over. No end-forending is necessary in merely changing sides. One of the flanges at the upper edge engages the groove in which the glass is received when rolled-up, securing the upper edge.

The adjustable duct portion may advantageously be a tube-shaped elbow having an open angle such as a 45° angle, and having at one end a swivel connection 28, as by overlapping complementary flanges with a stub tube 30 force-fitted or cemented in the hole. Preferably the hole provides a clear passage 2 inches in diameter. The invention may advantageously be made of clear plastic at least 5/32" thick. It has been discovered tht installing a unit according to this invention with the scoop outside facing rearwardly (by end-for-ending the unit from the air-scooping position) creates a low pressure at the scoop drawing air out of the automobile. This provision makes it possible to force air in one side of the automobile while drawing it out the other, creating cross-ventilation in a direction to suit the occupants, if desired. The symmetry of the invention and central location of the aperture make installation convenient and certain.

FIg. 4 shows a second embodiment 400 in which the plate 416 is made sufficiently thick for the flanges 424, 426 to be formed integrally, flush on one side with the faces of the plate. The duct 422 also may connect directly with the plate, the swivel connection 428 being made at a flange formed in circular aperture 418, within the plate thickness, for strength, durability and simplicity.

It can be seen from the foregoing that an improved, safe, pleasant energy saving and versatiley effective ventilation system is provided of minimum cost and complexity, which fits virtually every automobile of any vintage having windows which roll up to a seal at the top.

This invention is not to be construed as limited to the particular forms disclosed herein, snce these are to be regarded as illustrative rather than restrictive. It is, therefore, to be understood that the invention may be practiced within the scope of the claims otherwise than as specifically described.

An important optional provision appears further in FIG. 4 at 432, a slot in the air scoop wall, which may be generally of a length to extend across the aperture in height in front elevation and approximately 1/16 inch or more in width. In operation in the rain, this slot will serve as a drain for water separated out of air turning into the aperture by centrifugal force, thus permitting more efficient operation in wet weather. It is evident that the extent of the air scoop behind the aperture will also tend to prevent water from migrating into the aperture with the air during operation in the rain.

What is claimed and desired to be protected by United States Letters Patent is:

1. In an automobile ventilation system having a plate for installation and retention in the space above an automobile roll-up window and a seal thereabove, and venting means in said plate, the plate having upper and lower and front and rear edges and an outer face and an inner face relative to said an automobile when installed therein, the improvement comprising: the plate having an aperture centrally in the plate, an air scoop fixed in forward direction on the outer face at the aperture, a duct at the inner face having communication with the air scoop through the aperture for receiving air flow from the air scoop and expelling same in an automobile interior, duct orienting means on the plate and having intake in fixed alignment with the air scoop, for adjustably ducting the air in a selected direction in an automobile interior, means for sliding the plate in a forward and rearward direction including the plate having a length proportionally short relative to said a space above an automobile window for varying air flow expelled through the duct, means adapting the automobile ventiliation system for installation on either the left side or the right side of said an automobile, including: said forward and rearward edges of the plate being substantially upright, the lower edge of the plate and the upper edge of the plate being generally parallel and having each a double flange structure projecting therefrom, and the spacing between the flanges of each double flange structure being proportioned for receiving and retaining the edge of said an automobile roll-up window therebetween.

2. In an automobile ventilation system as recited in claim 1, each double-flange structure comprising a pair of strips with means affixing one of said pair of strips on the outer face of the plate and the other of said pair of strips on the inner face of the plate.

3. In an automobile ventilation system as recited in claim 1, each double-flange structure being integrally formed in the plate.

4. In an automobile ventilation system as recited in claim 1, the duct including a tube-shaped elbow with a circular cross section portion coaxial with said aperture, the duct orienting means fixed alignment including the tube-shaped elbow having a swivel connection about said axis, and an output end with a necked-down nozzle portion for increasing the velocity of air when passing therefrom.

5. In an automobile ventilation system as recited in claim 4, the air scoop comprising substantially an ellipsoidal shape open toward the front edge of the plate and having structure defining a slot therein proximately along the plate in front elevational view and extending generally across the aperture in height, for separation of water from air entering the aperture.

6. In an automobile ventilation system as recited in claim 5, the air scoop extending behind the aperture a distance tending to prevent water from migrating into the aperture during operation in the rain.

7. In an automobile ventilation system as recited in claim 4, the tube-shaped elbow swivel connection being to the plate within the thickness of the plate.

* * * * *